(12) United States Patent
Tsujita et al.

(10) Patent No.: US 11,183,684 B2
(45) Date of Patent: Nov. 23, 2021

(54) CATHODE ACTIVE MATERIAL AND BATTERY USING THE SAME

(71) Applicant: Panasonic Intellectual Property Management Co., Ltd., Osaka (JP)

(72) Inventors: Takuji Tsujita, Osaka (JP); Kensuke Nakura, Osaka (JP); Shuhei Uchida, Osaka (JP); Ryuichi Natsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 16/459,614

(22) Filed: Jul. 2, 2019

(65) Prior Publication Data

US 2020/0075936 A1 Mar. 5, 2020

(30) Foreign Application Priority Data

Sep. 5, 2018 (JP) .............................. JP2018-165572

(51) Int. Cl.
| | |
|---|---|
| *H01M 4/36* | (2006.01) |
| *H01M 4/485* | (2010.01) |
| *H01M 4/62* | (2006.01) |
| *H01M 10/0525* | (2010.01) |
| *H01M 4/505* | (2010.01) |
| *H01M 4/02* | (2006.01) |

(52) U.S. Cl.
CPC .......... *H01M 4/364* (2013.01); *H01M 4/366* (2013.01); *H01M 4/485* (2013.01); *H01M 4/505* (2013.01); *H01M 4/628* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 8,802,291 | B2 * | 8/2014 | Li | ......................... | C01G 53/54 |
|---|---|---|---|---|---|
| | | | | | 429/218.1 |
| 2012/0040250 | A1 * | 2/2012 | Kobori | .................. | H01M 4/139 |
| | | | | | 429/232 |
| 2016/0056462 | A1 | 2/2016 | Sakai et al. | | |
| 2017/0179470 | A1 * | 6/2017 | Choi | .................... | C01G 53/006 |
| 2021/0057717 | A1 * | 2/2021 | Natsui | ................... | H01M 4/525 |

FOREIGN PATENT DOCUMENTS

WO 2014/192759 12/2014

* cited by examiner

*Primary Examiner* — Anca Eoff
(74) *Attorney, Agent, or Firm* — McDermott Will & Emery LLP

(57) ABSTRACT

A cathode active material includes a lithium composite oxide and a covering material which covers a surface of the lithium composite oxide. The lithium composite oxide is a multi-phase mixture including a first phase having a crystal structure which belongs to a space group C2/m and a second phase having a crystal structure which belongs to a space group R-3m. The lithium composite oxide has an integral intensity ratio $I_{(18°\text{-}20°)}/I_{(43°\text{-}46°)}$ of not less than 0.05 and not more than 1.15, where the integral intensity ratio $I_{(18°\text{-}20°)}/I_{(43°\text{-}46°)}$ is a ratio of an integral intensity $I_{(18°\text{-}20°)}$ to an integral intensity $I_{(43°\text{-}46°)}$. The integral intensity $I_{(\alpha°\text{-}\beta°)}$ is an integral intensity of a first peak which is a maximum peak present within a range of a diffraction angle 2θ of not less than α° and not more than β° in an X-ray diffraction pattern of the lithium composite oxide.

20 Claims, 3 Drawing Sheets

CATHODE ACTIVE MATERIAL AND BATTERY USING THE SAME

CROSS-REFERENCE, TO RELATED APPLICATIONS

This application claims priority to JP 2018-165572 filed on Sep. 5, 2018.

BACKGROUND

1. Technical Field

The present disclosure relates to a cathode active material and a battery using the same.

2. Description of the Related Art

Patent Literature 1 discloses a lithium composite transition metal oxide having a chemical composition represented by a general formula $Li_aMO_x$ (where M is an element including at least one element selected from a Ni element, a Co element, and an Mn element). In the X-ray diffraction pattern of the lithium composite transition metal oxide, a ratio ($I_{020}/I_{003}$) of an integral intensity ($I_{020}$) of a peak of a (020) plane which belongs to a crystal structure of a space group C2/m to an integral intensity ($I_{003}$) of a peak of a (003) plane which belongs to a crystal structure of a space group R-3 m is 0.02-0.3.

CITATION LIST

Patent Literature

Patent Literature 1: WO 2014/192759

SUMMARY

An object of the present disclosure is to provide a cathode active material used for a battery having a high capacity and high cycle characteristic.

The present disclosure provides a cathode active material comprising:
a lithium composite oxide; and
a covering material which covers a surface of the lithium composite oxide,
wherein
the lithium composite oxide is a multi-phase mixture including:
a first phase having a crystal structure which belongs to a space group C2/m; and
a second phase having a crystal structure which belongs to a space group R-3 m;
the following mathematical formula (I) is satisfied:

$$0.05 \leq \text{integral intensity ratio } I_{(18°\text{-}20°)}/I_{(43°\text{-}46°)} \leq 1.15 \quad (I)$$

the integral intensity ratio $I_{(18°\text{-}20°)}/I_{(43°\text{-}46°)}$ is a ratio of an integral intensity $I_{(18°\text{-}20°)}$ to an integral intensity $I_{(43°\text{-}46°)}$;
the integral intensity $I_{(43°\text{-}46°)}$ is an integral intensity of a first peak which is a maximum peak present within a range of a diffraction angle 2θ of not less than 43° and not more than 46° in an X-ray diffraction pattern of the lithium composite oxide; and
the integral intensity $I_{(18°\text{-}20°)}$ is an integral intensity of a second peak which is a maximum peak present within a range of a diffraction angle 2θ of not less than 18° and not more than 20° in the X-ray diffraction pattern of the lithium composite oxide, and
the covering material has an electronic conductivity of not more than $10^6$ S/m.

The present disclosure provides a cathode active material to achieve a battery having a high capacity and a high cycle characteristic. The present disclosure also provides a battery comprising a cathode including the cathode active material, an anode, and an electrolyte. The battery has a high capacity and a high cycle characteristic.

DETAILED DESCRIPTION OF THE EMBODIMENTS

Figure 1:
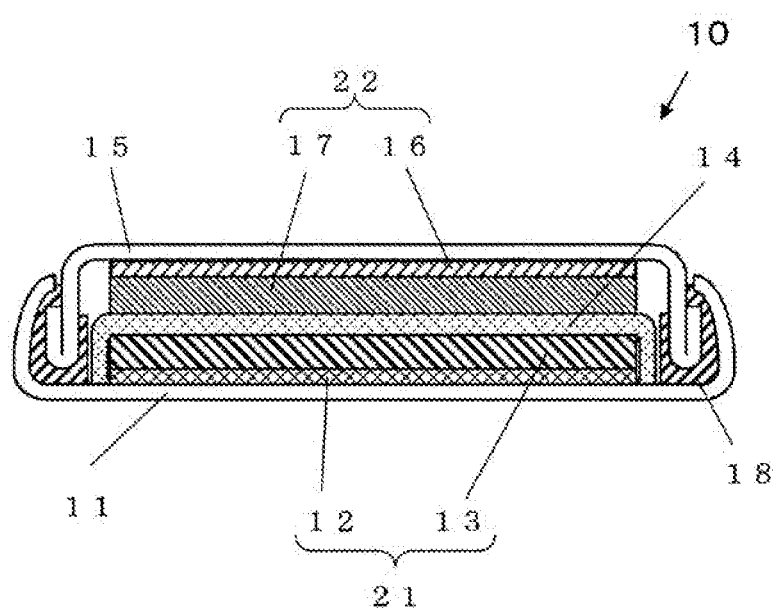
FIG. 1 shows a cross-sectional view of a battery according to the second embodiment.

Hereinafter, the embodiments of the present disclosure will be described with reference to the drawings.

First Embodiment

A cathode material according to the first embodiment comprising:
a lithium composite oxide; and
a covering material which covers a surface of the lithium composite oxide.

The lithium composite oxide is a multi-phase mixture including:
a first phase having a crystal structure which belongs to a space group C2/m; and
a second phase having a crystal structure which belongs to a space group R-3 m.

The following mathematical formula (I) is satisfied:

$$0.05 \leq \text{integral intensity ratio } I_{(18°\text{-}20°)}/I_{(43°\text{-}46°)} \leq 1.15 \quad (I)$$

where
the integral intensity ratio $I_{(18°\text{-}20°)}/I_{(43°\text{-}46°)}$ is a ratio of an integral intensity $I_{(18°\text{-}20°)}$ to an integral intensity $I_{(43°\text{-}46°)}$;
the integral intensity $I_{(43°\text{-}46°)}$ is an integral intensity of a first peak which is a maximum peak present within a range of a diffraction angle 2θ of not less than 43° and not more than 46° in an X-ray diffraction pattern of the lithium composite oxide; and
the integral intensity $I_{(18°\text{-}20°)}$ is an integral intensity of a second peak which is a maximum peak present within a range of a diffraction angle 2θ of not less than 18° and not more than 20° in the X-ray diffraction pattern of the lithium composite oxide.

The covering material has an electronic conductivity of not more than $10^6$ S/m.

The cathode active material is used to provide a battery having a high capacity and a high cycle characteristic.

The term "a battery having a high cycle characteristic" means a battery having a high capacity maintenance ratio even after a plurality of charge-discharge cycles are repeated. In other words, the term "a battery having a high cycle characteristic" means a battery in which the capacity thereof is not lowered significantly after the plurality of the charge-discharge cycles are repeated.

A lithium ion battery comprising the cathode active material according to the first embodiment has an oxidation-reduction potential of approximately 3.4 volts (vs $Li/Li^+$). The lithium ion battery has a capacity of not less than approximately 260 mAh/g. The lithium ion battery has a capacity maintenance ratio of not less than approximately 90, even after the charge-discharge tests are repeated 20 cycles.

When a conventional cathode active material is used at high electric potential, decomposition (e.g., a side reaction) of an electrolyte proceeds to generate a resistance layer. Furthermore, when a conventional cathode active material is used at high electric potential, anions included in the cathode active material are desorbed as a gas. Therefore, a cycle characteristic may be lowered.

The cathode active material according to the first embodiment includes not only the lithium composite oxide but also a covering material. The covering material covers a surface of the lithium composite oxide. The covering material is a material having electronic conductivity of not more than $10^6$ S/m and is not the same as the lithium composite oxide. In other words, the material of the covering material is not the same as the material of the lithium composite oxide. The covering material covers the surface of the lithium composite oxide to prevent the lithium composite oxide from being brought into contact with the electrolyte. Since the electronic conductivity of the covering material is low, electrons prevented from migrating between the lithium composite oxide and the electrolyte. Furthermore, a side reaction generated due to the migration of the electrons is also prevented. In this way, generation of the resistance layer or desorption of the gas is suppressed. Therefore, a battery having the high cycle characteristic is achieved.

In other words, the battery comprising the cathode active material according to the first embodiment is excellent in the cycle characteristic, even when used at high electric potential.

In the present disclosure, "cover the surface" includes covering the surface entirely and covering the surface partially.

In the first embodiment, a mass ratio of the covering material to the lithium composite oxide may be not more than 0.2.

If the mass ratio is not more than 0.2, the surface of the cathode active material according to the first embodiment is prevented from being deactivated. As a result, the resistance value is prevented from being raised. In this way, a battery having the high capacity and the high characteristic is achieved.

To achieve a battery having the high capacity and the high characteristic, the mass ratio may be not less than 0.01 and not more than 0.1.

To achieve a battery having the high capacity and the high characteristic, in the first embodiment, the covering material may have a shape of a film. The covering material may have a thickness of not less than 0.1 nanometer and not more than 10 nanometers.

If the thickness of the covering material is not less than 0.1 nanometers, uniformity of the thickness is raised. If the thickness of the covering material is not less than 0.1 nanometers, insulation breakdown is prevented.

If the thickness of the covering material is not more than 10.0 nanometers, since the covering material is sufficiently thin, Li conductivity is not impaired.

To further improve the cycle characteristic, in first embodiment, the covering material may have a thickness of not less than 5.0 nanometers and not more than 10.0 nanometers.

In the first embodiment, the covering material may modify the surface of the lithium composite oxide chemically.

In the first embodiment, the covering material may forms a solid solution with at least a part of the surface of the lithium composite oxide.

The chemical modification or the solid solution further prevents metal elements from being eluted (e.g., desorbed). As a result, the cycle characteristic of the battery is further improved.

In the first embodiment, the covering material is, for example, an inorganic material.

In the first embodiment, the covering material may be at least one selected from the group consisting of graphite, carbon black and fluorinated graphite. An example of the carbon black is acetylene black, ketjen black, channel black, furnace black, lamp black, or thermal black.

In the first embodiment, the covering material may be formed of an insulation compound. The covering material does not have to contribute an electrochemical reaction.

In the first embodiment, the covering material may be at least one selected from the group consisting of an oxide, an oxynitride, a halogen compound, a sulfide, and a phosphorus compound.

For example, the halogen compound may be $AlF_3$.

In the first embodiment, the covering material may be a lithium ion conductor.

An example of the lithium ion conductor is (I) lithium compounds such as $LiBO_2$, $Li_3PO_4$, $LiNbO_3$, $LiNbO_2$, $LiAlO_2$, $Li_2SO_4$, $Li_2MoO_4$, $Li_4SiO_4$, $Li_4FeO_4$, $Li_4ZrO_4$, $Li_2CO_3$, $LiW_2O_7$, $Li_3VO_4$, LiCl, LiBr, LiI or $Li_2Se$, (ii) lithium ion conductive glass such as $Li_2O—B_2O_3$, $Li_2O—Al_2O_3$, $Li_2O—SiO_4$, $Li_2O—P_2O_5$, $LiF—BF_3$, $LiF—AlF_3$, or $LiF—VF_3$, or (iii) the above-mentioned lithium ion conductor in which a part of oxygen has been replaced with nitrogen.

Two or more kinds of lithium ion conductors may be used.

The cathode active material comprising the covering material of the lithium ion conductor improves the cycle characteristic of the battery.

In the first embodiment, the covering material may be a Li-containing oxide having high Li conductivity or a Li-containing oxide in which a part of oxygen has been replaced with nitrogen.

An example of the Li-containing oxide is a lithium borate, a lithium niobate, a lithium cobaltate, a lithium titanate, or a lithium aluminate. Two or more Li-containing oxides may be used.

The Li-containing oxide improves diffusivity of lithium ions to further improve the capacity of the battery.

In the first embodiment, if Li is allowed to be occluded in the covering material during the charge and the discharge, the capacity of the battery is further improved. In this case, the covering material has a charge-discharge capacity. Therefore, even if a mass ratio of the lithium composite oxide to the entire of the cathode active material is lowered, the capacity of the battery is maintained high.

To further improve the cycle characteristic, in first embodiment, the covering material may an oxide or an oxynitride.

The oxide or the oxynitride is chemically stable and has low reactivity with the electrolyte. Therefore, the crystal structure of the oxide or the oxynitride would be maintained in the electrochemical reaction.

To further improve the cycle characteristic, in the first embodiment, the covering material may be an oxide or an oxynitride represented by the following chemical formula (1)

where

A is at least one selected from the group consisting of Mn, Co, Ni, Fe, Cu, Nb, Mo, Ti, Al, Cr, Zr, Zn, Na, K, Ca, Mg, Pt, Au, B, P, Si, Eu, Sm, Ce, and H, $0 \leq a \leq 3$,
$0.5 \leq b \leq 4$,
$1 \leq c \leq 4$, and
$0 \leq d \leq 1$.

To further improve the cycle characteristic, in the first embodiment, the covering material may be formed of, for example, at least one kind of oxide selected from the group consisting of $NiO_2$, $CoO_2$, $MnO_2$, $Al_2O_3$, $MgO$, $SiO_2$, $ZrO_2$, $ZnO$, $TiO_2$, $H_3BO_3$, $Mn_2O_3$, $Fe_2O_3$, $CuO$, $NiO$, $Co_3O_4$, $Eu_2O_3$, $Sm_2O_3$, and $CeO_2$.

To further improve the cycle characteristic, in the first embodiment, the covering material may be formed of, for example, at least one selected from the group consisting of $NiO_2$, $CoO_2$, $MnO_2$, $Al_2O_3$, $MgO$, $SiO_2$, $ZrO_2$, $LiNbO_3$, $LiBO_2$, and $Li_{3-e}PO_{4-f}N_g$ (where $0 \leq e \leq 3$, $0 \leq f \leq 3$, and $0 \leq g \leq 1$).

To further improve the cycle characteristic, in the first embodiment, the covering material may be formed of, for example, at least one selected from the group consisting of $LiNbO_3$, $LiBO_2$, and $Li_{3-e}PO_{4-f}N_g$ (where $0 \leq e \leq 3$, $0 \leq f \leq 3$, and $0 \leq g \leq 1$).

To further improve the cycle characteristic, in the first embodiment, the covering material may be formed of, for example, at least one selected from the group consisting of $Al_2O_3$, $MgO$, $SiO_2$, and $ZrO_2$.

To further improve the capacity and the cycle characteristic of the battery, in the first embodiment, the covering material may be formed of $Al_2O_3$.

To further improve the cycle characteristic, in the first embodiment, the covering material may be formed of, for example, a transition metal oxide.

In the first embodiment, the covering material may have the same metal element as the metal element included in the lithium composite oxide.

If the covering material has the same metal element as the metal elements included in the lithium composite oxide, the metal element form a solid solution at an interface between the lithium composite oxide and the covering material to bind the lithium composite oxide and the covering material to each other. Therefore, the metal elements are prevented from being eluted (e.g., desorbed). In this way, the cycle characteristic of the battery is further improved.

In the first embodiment, the covering material may cover not only the lithium composite oxide but also a current collector, an electron conductivity auxiliary agent, or binder included in the cathode.

The cathead active material according to the first embodiment includes the lithium composite oxide which is a multi-phase mixture including the first phase having a crystal structure which belongs to the space group C2/m and the second phase having a crystal structure which belongs to the space group R-3m.

The crystal structure which belongs to a space group C2/m has a structure in which Li layers and transition metal layers are stacked alternately. The transition metal layers may contain not only a transition metal but also Li. For this reason, a more amount of Li is occluded in the crystal structure which belongs to the space group C2/m than that of $LiCoO_2$, which is a conventional material typically used. However, in case where only the crystal structure which belongs to the space group C2/m is used, atomic rearrangement occurs due to migration of Li in the transition metal layer. The atomic rearrangement would lower the cyclic characteristic of the battery.

The crystal structure which belongs to a space group R-3m has a structure in which Li layers and transition metal layers are stacked alternately. Since the desorption and insertion of Li during the charge and discharge occur in a two-dimensional plane of the Li layer in the crystal structure which belongs to the pace group R-3m, the diffusivity of Li is high. For this reason, a battery excellent in a rate characteristic would be achieved.

As just described, in the first embodiment, the lithium composite oxide includes the first phase having a crystal structure which belongs to the space group C2/m and the second phase having a crystal structure which belongs to the space group R-3m to improve the capacity of the battery. Such a battery would be suitable for quick charge.

In the first embodiment, the following mathematical formula (I) is satisfied.

$$0.05 \leq \text{Integral Intensity Ratio } I_{(18°-20°)}/I_{(43°-46°)} \leq 1.15 \quad (I)$$

where the integral intensity ratio $I_{(18°-20°)}/I_{(43°-46°)}$ is a ratio of an integral intensity $I_{(18°-20°)}$ to an integral intensity $I_{(43°-46°)}$;

the integral intensity $I_{(43°-46°)}$ is an integral intensity of a first peak which is a maximum peak present within a range of a diffraction angle 2θ of not less than 43° and not more than 46° in an X-ray diffraction pattern of the lithium composite oxide; and the integral intensity $I_{(18°-20°)}$ is an integral intensity of a second peak which is a maximum peak present within a range of a diffraction angle 2θ of not less than 20° and not more than 23° in the X-ray diffraction pattern of the lithium composite oxide.

In other words, the integral intensity ratio $I_{(18°-20°)}/I_{(43°-46°)}$ is a parameter which can be used as an index of cation mixing in the lithium composite oxide having the crystal structure which belongs to the layer structure. The "cation mixing" in the present disclosure means a state where a lithium atom and a cation of the transition metal are substituted with each other in the crystal structure of the lithium composite oxide. As the cation mixing is smaller, the integral intensity ratio $I_{(18°-20°)}/I_{(43°-46°)}$ is larger. As the cation mixing is larger, the integral intensity ratio $I_{(18°-20°)}/I_{(43°-46°)}$ is smaller.

In the first embodiment, if the integral intensity ratio $I_{(18°-20°)}/I_{(43°-46°)}$ is less than 0.05, since the cation mixing is excessive, the occupancy of Li in the "transition metal layer" is excessively high. As a result, the crystal structure is unstable thermodynamically. For this reason, the crystal structure is deteriorated due to Li desorption during the charge to cause the capacity of the battery to be insufficient.

In the first embodiment, if the integral intensity ratio $I_{(18°-20°)}/I_{(43°-46°)}$ is more than 1.15, the cation mixing is suppressed to lower the occupancy of Li in the transition metal layer. As a result, three-dimensional diffusion path of Li is made smaller. For this reason, the diffusivity of Li is decreased to cause the capacity of the battery to be insufficient.

In the first embodiment, since the lithium composite oxide is the multi-phase mixture which includes the first phase having the crystal structure which belongs to the space group C2/m and the second phase having the crystal structure which belongs to the space group R-3m, and has the integral intensity ratio $I_{(18°\text{-}20°)}/I_{(43°\text{-}46°)}$ of not less than 0.05 and not more than 1.15, the amount of the cation mixing is relatively large in the lithium composite oxide. For this reason, in the cation site (namely, the Li layers and the transition metal layers), the cation mixing would occur sufficiently between the lithium atoms and cation atoms of the transition metal. This improves not only the diffusivity of Li in the inside of the Li layers but also the diffusivity of Li in the inside of the transition metal layers. Furthermore, the diffusivity of Li between the Li layers and the transition metal layers is improved. In other words, in the entire of the cation site, Li is diffused efficiently. As just described, the lithium composite oxide is suitable for improvement of the capacity of the battery, compared to a traditional regularly-arranged lithium composite oxide (namely, a lithium composite oxide having a small amount of the cation mixing).

As a prior art (i.e., as a comparative example), Patent Literature 1 discloses a lithium composite transition metal oxide. The lithium composite transition metal oxide disclosed in Patent Literature 1 has both space groups R-3m and C2/m and has a chemical composition represented by a general formula $Li_aMO_x$ (where M is an element including at least one element selected from a Ni element, a Co element, and an Mn element).

However, a prior art such as Patent Literature 1 fails to disclose or suggest the lithium composite oxide which includes the first phase having the crystal structure which belongs to the space group C2/m and the second phase having the crystal structure which belongs to the space group R-3m, and has the integral intensity ratio $I_{(18°\text{-}20°)}/I_{(43°\text{-}46°)}$ of not less than 0.05 and not more than 1.15.

In the first embodiment, since the lithium composite oxide satisfies the above elements, the atoms would be prevented from being rearranged upon the desorption of Li. In this way, the diffusivity of Li is maintained high, and Li in large amount is allowed to be inserted and desorbed. The crystal structure is maintained stable. In other words, such a lithium composite oxide would not be obvious over prior arts. Such a lithium composite oxide further improves the capacity of the battery.

In the first embodiment, the lithium composite oxide may have the integral intensity ratio $I_{(18°\text{-}20°)}/I_{(43°\text{-}46°)}$ of not less than 0.62 and not more than 1.15. The crystal structure of such a lithium composite oxide is further stabilized thermodynamically. As a result, such a lithium composite oxide further improves the capacity of the battery.

In the first embodiment, the lithium composite oxide may have the integral intensity ratio $I_{(18°\text{-}20°)}/I_{(43°\text{-}46°)}$ of not less than 0.62 and not more than 0.99. In such a lithium composite oxide, the amount of the cation mixing is increased. As a result, the three-dimensional diffusion path of Li is made larger to further improve the capacity of the battery.

In the first embodiment, the following mathematical formula (II) may be satisfied:

$$0.08 \le \text{Integral Intensity Ratio } I_{(20°\text{-}23°)}/I_{(18°\text{-}20°)} \le 0.25 \quad (II)$$

where the integral intensity ratio $I_{(20°\text{-}23°)}/I_{(18°\text{-}20°)}$ is a ratio of an integral intensity $I_{(20°\text{-}23°)}$ to the integral intensity $I_{(18°\text{-}20°)}$;

the integral intensity $I_{(20°\text{-}23°)}$ is an integral intensity of a third maximum peak which is present within a range of a diffraction angle 2θ of not less than 20° and not more than 23° in an X-ray diffraction pattern of the lithium composite oxide.

The integral intensity ratio $I_{(20°\text{-}23°)}/I_{(18°\text{-}20°)}$ is a parameter which can be used as an index of an abundance ratio between the first phase and the second phase in the lithium composite oxide. With an increase in the abundance ratio of the first phase, the integral intensity ratio $I_{(20°\text{-}23°)}/I_{(18°\text{-}20°)}$ would be increased. On the other hand, with an increase in the abundance ratio of the second phase, the integral intensity ratio $I_{(20°\text{-}23°)}/I_{(18°\text{-}20°)}$ would be decreased.

If the integral intensity ratio $I_{(20°\text{-}23°)}/I_{(18°\text{-}20°)}$ is not less than 0.08, since the abundance ratio of the first phase is increased, the insertion amount and the desorption amount of Li during the charge and discharge would be increased to improve the capacity of the battery.

If the integral intensity ratio $I_{(20°\text{-}23°)}/I_{(18°\text{-}20°)}$ is not more than 0.25, since the abundance ratio of the second phase is increased, the diffusivity of Li is improved to improve the capacity of the battery.

The integral intensity of the X-ray diffraction peak is allowed to be calculated, for example, with a software attached to an X-ray diffraction device (e.g., a software with a trade name of PDXL, which is attached to a powder X-ray diffraction device, product of Rigaku Corporation). In this case, the integral intensity of the X-ray diffraction peak is provided by calculating an area from a height and a half value width of the X-ray diffraction peak.

Generally, in the XRD pattern using a CuKα ray, in a case of the crystal structure which belong to the space group C2/m, the maximum peak which is present within a range of a diffraction angle 2θ of not less than 18° and not more than 20° reflects a (001) plane. The maximum peak which is present within a range of a diffraction angle 2θ of not less than 20° and not more than 23° reflects a (020) plane. The maximum peak which is present within a range of a diffraction angle 2θ of not less than 43° and not more than 46° reflects a (114) plane.

Generally, in the XRD pattern using a CuKα ray, in a case of the crystal structure which belong to the space group R-3m, the maximum peak which is present within a range of a diffraction angle 2θ of not less than 18° and not more than 20° reflects a (003) plane. No peak is present within a range of a diffraction angle 2θ of not less than 20° and not more than 23°. The maximum peak which is present within a range of a diffraction angle 2θ of not less than 43° and not more than 46° reflects a (104) plane.

Since the lithium composite oxide has the first phase having a crystal structure which belongs to the space group C2/m and the second phase having a crystal structure which belongs to the space group R-3m, there is a problem that it is not always easy to completely identify a space group and a plane index reflected by each of the maximum peaks which are present within a range of a diffraction angle 2θ of not less than 18° and not more than 20° and within a range of a diffraction angle 2θ of not less than 43° and not more than 46°.

To solve the problem, an electron beam diffraction measurement using a transmission electron microscope (hereinafter, referred to as "TEM") may be conducted in addition of the above-mentioned X-ray diffraction measurement. The electron diffraction pattern is observed by a known method to allow the space group of the lithium composite oxide to be identified in the first embodiment. In this way, in the first embodiment, the lithium composite oxide is confirmed to include the first phase having the crystal structure which belongs to the space group C2/m and the second phase having the crystal structure which belongs to the space group R-3m.

In the lithium composite oxide, a plurality of areas each consisting of the first phase and a plurality of areas each consisting of the second phase may be randomly located three-dimensionally.

Since such a random location makes the three-dimensional diffusion path of Li larger, Li in larger amount is allowed to be inserted and desorbed to further improve the capacity of the battery.

In the first embodiment, the lithium composite oxide is a multi-phase mixture. A layer structure composed of a bulk layer and a coat layer which covers the bulk layer is excluded from the multi-phase mixture in the present disclosure. The multi-phase mixture means a substance including a plurality of phases. In the produce of the lithium composite oxide, a plurality of the materials which corresponds to these phases may be mixed.

As will be described later, whether or not the lithium composite oxide is a multi-phase mixture is determined by an X-ray diffraction measurement method and by an electron beam diffraction measurement method. In particular, if a peak indicating characteristics of the plurality of the phases is included in a spectrum of the lithium composite oxide provided by the X-ray diffraction measurement method and by the electron beam diffraction measurement method, the lithium composite oxide is determined to be a multi-phase mixture.

To further improve the capacity of the battery, in the first embodiment, the lithium composite oxide may be a two-phase mixture composed of the first phase and the second phase.

To further improve the capacity of the battery, in the first embodiment, the lithium composite oxide includes not only the lithium atoms but also atoms other than the lithium atoms. An example of the atoms other than the lithium atoms is Mn, Co, Ni, Fe, Cu, V, Nb, Mo, Ti, Cr, Zr, Zn, Na, K, Ca, Mg, Pt, Au, Ag, Ru, W, B, Si, P, or Al. The lithium composite oxide may include one kind of the atoms other than the lithium atoms.

Alternatively, the lithium composite oxide may include two or more kinds of the atoms other than the lithium atoms.

To further improve the capacity of the battery, in the first embodiment, the lithium composite oxide may include at least one kind of a 3d transition metal element selected from the group consisting of Mn, Co, Ni, Fe, Cu, V, Ti, Cr, and Zn, as the atoms other than the lithium atoms.

To further improve the capacity of the battery, in the first embodiment, the lithium composite oxide may include at least one selected from the group consisting of Mn, Co, Ni, Mg, and Al, as the atoms other than the lithium atoms.

To further improve the capacity of the battery, in the first embodiment, the lithium composite oxide may include at least one selected from the group consisting of Mn, Co, Ni, Mg, and Al as the atoms other than the lithium atoms.

In the first embodiment, the lithium composite oxide may contain Mn.

Since orbital hybridization of Mn with oxygen is easily formed, the oxygen desorption during the charge is suppressed. As above described, in the crystal structure having the first phase and the second phase, the crystal phase is further stabilized. For this reason, Li in larger amount would be allowed to be inserted and desorbed. As a result, the capacity of the battery is improved.

In the first embodiment, the lithium composite oxide may include not only Mn but also Co and Ni.

As previously described, the hybrid orbital of Mn with oxygen is easily formed. The crystal structure is stabilized by Co. The desorption of Li is promoted by Ni. For these three reasons, the lithium composite oxide containing not only Mn but also Co and Ni has a further stable crystal structure. For this reason, the lithium composite oxide containing not only Mn but also Co and Ni further improves the capacity of the battery.

In the first embodiment, the lithium composite oxide may include at least one kind of element selected from the group consisting of F, Cl, N, and S. The at least one kind of element stabilizes the crystal structure of the lithium composite oxide.

A part of oxygen atoms included in the lithium composite oxide may be substituted with electrochemically inactive anions. In other words, the part of oxygen atoms included in the lithium composite oxide may be substituted with the at least one kind of anion selected from the group consisting of F, Cl, N, and S. In the first embodiment, the substitution would stabilize the crystal structure of the lithium composite oxide. The substitution of the part of the oxygen atoms with anions each having a larger ion radius than the radius of the oxygen anion would expand a crystal lattice to improve the diffusivity of Li. An example of the anions each having a larger ion radius than the radius of the oxygen anion is at least one kind of anion selected from the group consisting of F, Cl, N, and S. As above described, in the crystal structure having the first phase and the second phase, the crystal structure would be further stabilized. For this reason, Li in larger amount would be allowed to be inserted and desorbed. In this way, the capacity of the battery is improved.

In the first embodiment, the lithium composite oxide may contain F.

Since a fluorine atom has high electronegativity, by substituting the part of the oxygen with fluorine atoms, interaction between cations and anions is increased to improve discharge capacity or operation voltage. For the same reason, electrons are localized due to solid solution of F, compared to the case where F is not included. For this reason, oxygen desorption during the charge is suppressed to stabilize the crystal structure. As above described, in the crystal structure having the first phase and the second phase, the crystal structure is further stabilized. For this reason, Li in larger amount would be allowed to be inserted and desorbed. Since these effects are exhibited integrally, the capacity of the battery is further improved.

Next, one example of the chemical composition of the lithium composite oxide will be described.

In the first embodiment, the lithium composite oxide may have an average composition represented by the following composition formula (II).

$$Li_xMe_yO_\alpha Q_\beta \qquad (II)$$

where

Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al; and Q may be at least one selected from the group consisting of F, Cl, N and S.

Furthermore, in the composition formula (II), the following four mathematical formulas may be satisfied:

$1.05 \leq x \leq 1.5$ $0.6 \leq y \leq 1.0$ $1.2 \leq \alpha \leq 2.0$; and $0 \leq \beta \leq 0.8$.

The above lithium composite oxide improves the capacity of the battery.

In a case where Me is represented by a chemical formula Me'$_{y1}$Me"$_{y2}$ (where Me' and Me" are the at least one selected for Me, each independently), "y=y1+y2" is satisfied. For example, if Me is Mn$_{0.6}$Co$_{0.2}$, "y=0.6+0.2=0.8" is satisfied. Even when Q consists of two or more elements, the calculation can be conducted similarly to the case of Me.

In a case where the value of x is not less than 1.05, an amount of lithium capable of being inserted in and desorbed from the cathode active material is increased. For this reason, the capacity is improved.

In a case where the value of x is not more than 1.5, the amount of lithium capable of being inserted in and desorbed from the cathode active material due to oxidation and reduction reaction of Me is increased. As a result, the need for the greater use of the oxidation-reduction reaction of oxygen is eliminated. In this way, the crystal structure is stabilized. For this reason, the capacity is improved.

In a case where the value of y is not less than 0.6, the amount of lithium capable of being inserted in and desorbed from the cathode active material due to the oxidation and reduction reaction of Me is increased. As a result, the need for the greater use of the oxidation-reduction reaction of oxygen is eliminated. In this way, the crystal structure is stabilized. For this reason, the capacity is improved.

In a case where the value of y is not more than 1.0, the amount of lithium capable of being inserted in and desorbed from the cathode active material is increased. For this reason, the capacity is improved.

In a case where the value of α is not less than 1.2, decrease in an electric charge compensation amount due to the oxidation and reduction of oxygen is suppressed. For this reason, the capacity is improved.

In a case where the value of α is not more than 2.0, excess of the capacity due to the oxidation and reduction of oxygen is suppressed. This stabilizes the crystal structure when Li is desorbed. For this reason, the capacity is improved.

In a case where the value of β is not more than 0.8, since the influence of electrochemical inactivity of Q is prevented from being grown, the electron conductivity is improved. For this reason, the capacity is improved.

In the first embodiment, "average composition" of the lithium composite oxide is a composition provided by analyzing the elements of the lithium composite oxide without consideration of the difference of each of the phases of the lithium composite oxide. Typically, the "average composition" means a composition provided by analyzing the element using a sample having the same size as or a greater size than a primary particle of the lithium composite oxide. The first phase and the second phase may have the same chemical composition as each other. Alternatively, the first phase and the second phase may have different composition from each other.

The above-mentioned average composition can be determined by an inductively coupled plasma emission spectrometry method, an inert gas melting-infrared absorption method, an ion chromatography method, or a combination of these analysis methods.

In order to improve the capacity of the battery, in the composition formula (II), Me may include at least one selected from the group consisting of Mn, Co, Ni, Fe, Cu, V, Ti, Cr, and Zn, namely, at least one 3d transition metal element.

In order to improve the capacity of the battery, in the composition formula (II), Me may include at least one selected from the group consisting of Mn, Co, Ni, Mg, and Al.

In order to improve the capacity of the battery, in the composition formula (II), Me may include at least one selected from the group consisting of Mn, Co, and Ni.

In the composition formula (II), Me may include Mn. In other words, Me may be Mn.

Alternatively, Me may include not only Mn but also at least one selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

As previously described, since orbital hybridization of Mn with oxygen is easily formed, the oxygen desorption during the charge is suppressed. In the crystal structure having the first phase, and the second phase, the crystal phase is further stabilized.

For this reason, Li in larger amount would be allowed to be inserted and desorbed. As a result, the capacity of the battery is improved.

In the composition formula (II), a molar ratio of Mn to Me may be not less than 60%. In other words, a molar ratio of Mn to the entire of Me, which includes Mn, (namely, a molar ratio of Mn/Me) may be not less than 0.6 and not more than 1.0.

As previously described, since orbital hybridization of Mn with oxygen is easily formed, the oxygen desorption during the charge is suppressed. In the crystal structure having the first phase and the second phase, the crystal phase is further stabilized. For this reason, Li in larger amount would be allowed to be inserted and desorbed. As a result, the capacity of the battery is improved.

In the composition formula (II), Me may include not only Mn but also Co and Ni.

As previously described, the hybrid orbital of Mn with oxygen is easily formed. The crystal structure is stabilized by Co. The desorption of Li is promoted by Ni. For these three reasons, the lithium composite oxide containing not only Mn but also Co and Ni has a further stable crystal structure. For this reason, the lithium composite oxide containing not only Mn but also Co and Ni further improves the capacity of the battery.

In the composition formula (II), Me includes at least one element selected from the group consisting of B, Si, P and Al in such a manner that a molar ratio of the at least one element to Me is not more than 20%.

Since B, Si, P and Al have high covalent character, the crystal structure of the lithium composite oxide is stabilized in the first embodiment. As a result, the cycle characteristic is improved to further extend a life-span of the battery.

The following two mathematical formulas may be satisfied.

$1.166 \leq x \leq 1.33$ and
$0.67 \leq y \leq 0.834$.

The above two mathematical formulas are satisfied to further improve the capacity of the battery.

The following two mathematical formulas may be satisfied.

$1.33 \leq \alpha \leq 2.0$ and
$0 \leq \beta \leq 0.67$.

The above two mathematical formulas are satisfied to further improve the capacity of the battery.

The following two mathematical formulas may be satisfied.

$1.33 \leq \alpha < 2.0$ and
$0 < \beta \leq 0.67$.

The above two mathematical formulas are satisfied to further improve the capacity of the battery.

As above described, the lithium composite oxide represented by the composition formula (II) may include Q (namely, at least one kind selected from the group consisting of F, Cl, N, and S). The at least one kind of element stabilizes the crystal structure of the lithium composite oxide.

A part of oxygen atoms included in the lithium composite oxide may be substituted with electrochemically inactive anions. In other words, the part of oxygen atoms included in the lithium composite oxide may be substituted with the at least one kind of anion selected from the group consisting of F, Cl, N, and S. The substitution would further stabilize the crystal structure of the lithium composite oxide represented by the composition formula (II). The substitution of the part of the oxygen atoms with anions each having a larger ion radius than the radius of the oxygen anion would expand a crystal lattice to improve the diffusivity of Li. As above described, in the crystal structure having the first phase and the second phase, the crystal structure would be further stabilized. For this reason, Li in larger amount would be allowed to be inserted and desorbed. In this way, the capacity of the battery is improved.

Q may include F. In other words, Q may be F.

Alternatively, Q includes not only F but also at least one kind of element selected from the group consisting of Cl, N, and S.

Since a fluorine atom has high electronegativity, by substituting the part of the oxygen with fluorine atoms, interaction between cations and anions is increased to improve discharge capacity or operation voltage. For the same reason, electrons are localized due to solid solution of F, compared to the case where F is not included. For this reason, oxygen desorption during the charge is suppressed to stabilize the crystal structure. As above described, in the crystal structure having the first phase and the second phase, the crystal structure is further stabilized. For this reason, Li in larger amount would be allowed to be inserted and desorbed. Since these effects are exhibited integrally, the capacity of the battery is further improved.

The following two mathematical formulas may be satisfied.

$1.33 \leq \alpha \leq 1.9$ and
$0.1 \leq \beta \leq 0.67$.

The above two mathematical formulas are satisfied to suppress the excess of the capacity due to the oxidation and reduction of oxygen. As a result, the electrochemically inactive effect of Q is exhibited sufficiently to stabilize the crystal structure even when Li is desorbed. In this way, the capacity of the battery is further improved.

A molar ratio of Li to Me is represented by the mathematical formula $(x/y)$.

To further improve the capacity of the battery, the molar ratio $(x/y)$ may be not less than 1.4 and not more than 2.0.

If the molar ratio $(x/y)$ is more than 1, for example, a ratio of the number of the Li atoms in the lithium composite oxide is higher than a ratio of the number of the Li atoms in the conventional lithium composite oxide represented by the composition formula $LiMnO_2$. For this reason, Li in larger amount is allowed to be inserted and desorbed.

If the molar ratio $(x/y)$ is not less than 1.4, since the usable amount of Li is large, the diffusion paths of Li are formed appropriately. For this reason, the molar ratio $(x/y)$ of not less than 1.4 improves the capacity of the battery.

If the molar ratio $(x/y)$ is not more than 2.0, the decrease in the oxidation-reduction reaction of the usable Me is suppressed. As a result, the need for the greater use of the oxidation-reduction reaction of oxygen is eliminated. The decrease in Li insertion efficiency during the discharge due to destabilization of the crystal structure upon the Li desorption during the charge is suppressed. For this reason, the capacity of the battery is improved.

To further improve the capacity of the battery, the molar ratio $(x/y)$ may be not less than 1.4 and not more than 1.5.

A molar ratio of O to Q is represented by the mathematical formula $(\alpha/\beta)$.

To further improve the capacity of the battery, the molar ratio $(\alpha/\beta)$ may be not less than 2 and not more than 19.

If the molar ratio $(\alpha/\beta)$ is not less than 2, the decrease in an electric charge compensation amount due to the oxidation and reduction of oxygen is suppressed. The electrochemically inactive effect of Q is lessened to improve the electron conductivity. For this reason, the capacity of the battery is further improved.

If the molar ratio $(\alpha/\beta)$ is not more than 19, the excess of the capacity due to the oxidation and reduction of oxygen is suppressed. This stabilizes the crystal structure when Li is desorbed. Furthermore, the electrochemically inactive effect of Q is exhibited to maintain the crystal structure stable even when Li is desorbed. For this reason, the capacity is improved.

As above described, the lithium composite oxide may have an average composition represented by the composition formula $Li_xMe_yO_\alpha Q_\beta$ in the first embodiment. Accordingly, in the first embodiment, the lithium composite oxide is composed of a cation part and an anion part. The cation part is composed of Li and Me. The anion part is composed of O and Q. A molar ratio of the cation part composed of Li and Me to the anion part composed of O and Q is represented by a mathematical formula $((x+y)/(\alpha+\beta))$.

To further improve the capacity of the battery, the molar ratio $((x+y)/(\alpha+\beta))$ may be not less than 0.75 and not more than 1.2.

If the molar ratio $((x+y)/(\alpha+\beta))$ is not less than 0.75, impurities in large amount are prevented from being generated in the lithium composite oxide during synthesis of the lithium composite oxide. As a result, the capacity of the battery is further improved.

If the molar ratio $((x+y)/(\alpha+\beta))$ is not more than 1.2, since an amount of the defect of the anion part of the lithium composite oxide is lowered, the crystal structure is maintained stable even after lithium is desorbed from the lithium composite oxide during the charge. For this reason, the capacity of the battery is further improved.

The molar ratio $((x+y)/(\alpha+\beta))$ of not less than 1.0 and not more than 1.2 further improves the capacity of the battery.

In the lithium composite oxide, a part of Li may be substituted with an alkali metal such as Na or K.

The cathode active material according to the first embodiment may contain the lithium composite oxide as a main component. In other words, the cathode active material according to the first embodiment may contain the lithium composite oxide in such a manner that a mass ratio of the lithium composite oxide to the entire of the lithium composite oxide is not less than 50%. Such a cathode active material improves the capacity of the battery.

To further improve the capacity of the battery, the mass ratio may be not less than 70%.

To further improve the capacity of the battery, the mass ratio may be not less than 90%.

The cathode active material according to the first embodiment may contain not only the lithium composite oxide but also inevitable impurities.

The cathode active material according to the first embodiment may include a staring material thereof as an unreacted substance. The cathode active material according to the first embodiment may include a by-product generated during the synthesis of the lithium composite oxide. The cathode active material according to the first embodiment may include a decomposition product generated due to the decomposition of the lithium composite oxide.

The lithium composite oxide included in the cathode active material according to the first embodiment may be formed of the lithium composite oxide only, except for the inevitable impurities.

Such a cathode active material improves the capacity and the cycle characteristic of the battery.

(Production Method for Lithium Composite Oxide)

Hereinafter, one example of production methods of the lithium composite oxide contained in the cathode active material according to the first embodiment will be described.

The lithium composite oxide is produced, for example, by the following method.

A starting material containing Li, a starting material containing Me, and a starting material containing Q are prepared.

An example of the starting material containing Li is a lithium oxide such as $Li_2O$ or $Li_2O_2$, a lithium salt such as $LiF$, $Li_2CO_3$, or $LiOH$, or a lithium composite oxide such as $LiMeO_2$ or $LiMe_2O_4$.

An example of the starting material containing Me is a metal oxide such as $Me_2O_3$, a metal salt such as $MeCO_3$ or $Me(NO_3)_2$, a metal hydroxide such as $Me(OH)_2$ or $MeOOH$, or a lithium composite oxide such as $LiMeO_2$ or $LiMe_2O_4$.

For example, if Me is Mn, an example of the starting material containing Mn is a manganese oxide such as $MnO_2$ or $Mn_2O_3$, a manganese salt such as $MnCO_3$ or $Mn(NO_3)_2$, a manganese hydroxide such as $Mn(OH)_2$ or $MnOOH$, or a lithium manganese composite oxide such as $LiMnO_2$ or $LiMn_2O_4$.

An example of the starting material containing Q is a lithium halide, a transition metal halide, a transition metal sulfide, or a transition metal nitride.

If Q is F, an example of the starting material containing F is LiF or a transition metal fluoride.

The starting materials is prepared in such a manner that the molar ratio of Li to the transition metal falls within the range of not less than 0.8 and not more than 1.0. The prepared starting materials are mixed by a dry method or a wet method, and then, react with each other mechanochemically for not less than 30 hours in a mixture machine such as a planetary ball mill to provide a first precursor of the lithium composite oxide.

Aside from this, the starting material containing Li, the starting material containing Me, and the starting material containing Q is prepared so as to have a different molar ratio from that of the first precursor. The prepared starting materials are mixed by a dry method or a wet method, and then, react with each other mechanochemically for not less than 30 hours in a mixture machine such as a planetary ball mill to provide a second precursor of the lithium composite oxide having a different composition ratio from that of the fist precursor.

Furthermore, the first precursor and the second precursor are prepared so as to have the molar ratio indicated by the composition formula (II). The prepared first and second precursors are mixed by a dry method or a wet method, and then, react with each other mechanochemically for not less than 1 hour in a mixture machine such as a planetary ball mill to provide a final precursor of the lithium composite oxide.

The method for providing the final precursor is not limited to the above-described method. For example, the method may include providing a third precursor having a different molar ratio from those of the first and second precursors. In this case, the first, second, and third precursors prepared so as to have the molar ratio indicated by the composition formula (II) are mixed by a dry method or a wet method, react with each other mechanochemically for not less than 1 hour in a mixture machine such as a planetary ball mill to provide the final precursor of the lithium composite oxide.

As just described, the values of x, y, $\alpha$, and $\beta$ may be varied within the range indicated in the composition formula (II).

The provided final precursor is subjected to heat treatment. The condition of the heat treatment is set appropriately in such a manner that the cathode active material including the lithium composite oxide is provided in the first embodiment. The most suitable condition is varied depending on the condition other than the condition of the heat treatment and on the targeted composition.

The temperature and the period may be selected within ranges of 200 degrees Celsius-900 degrees Celsius and 1 minute-20 hours, respectively. An example of the atmosphere of the heat treatment is the air atmosphere, an oxygen atmosphere, or an inert atmosphere (e.g., a nitrogen atmosphere or an argon atmosphere).

The present inventors found that the value of the integral intensity ratio $I_{(18°-20°)}/I_{(43°-46°)}$ tends to be smaller with an decrease in the Li context in the first precursor. Furthermore, the present inventors found that the value of the integral intensity ratio $I_{(18°-20°)}/I_{(43°-46°)}$ tends to be smaller with an decrease in the temperature of the heat treatment, or with an decrease in the period of the heat treatment. The producer can determine the condition of the heat treatment using these tendencies as a guideline.

As above described, the starting materials, the mixture condition of the starting material, and the heat treatment condition are adjusted to provide the lithium composite oxide.

The space group of the provided lithium composite oxide is identified, for example, by an X-ray diffraction measurement method or by an electron beam diffraction method. In this way, it is confirmed that the provided lithium composite oxide contains, for example, the first phase having the crystal structure which belongs to the space group C2/m and the second phase having the crystal structure which belongs to the space group R-3m.

The above-mentioned average composition can be determined by an inductively coupled plasma emission spectrometry method, an inert gas melting-infrared absorption method, an ion chromatography method, or a combination of these analysis methods.

The lithium transition metal composite oxide is used as the starting material to decrease energy of mixing of the elements. In this way, purity of the lithium composite oxide is raised in the first embodiment.

As above described, in the first embodiment, the production method of the lithium composite oxide comprises (a) preparing starting materials, (b) providing a precursor of the lithium composite oxide by mechanochemical reaction of the starting materials, and (c) providing the lithium composite oxide by heat treatment of the precursor.

The starting material may be a mixture of the starting materials. In the mixture, the ratio of Li to Me may be not less than 1.4 and not more than 2.0.

The lithium compound which is used as the starting material may be fabricated by a publicly known method.

In the step (b), the mechanochemical reaction may be repeat two or three times using the ball mill.

As above described, in the first embodiment, the starting material (for example, LiF, $Li_2O$, the transition metal oxide, or lithium composite oxide) may be mixed by mechanochemical reaction with the planetary ball mill to provide the precursors, and then, the precursors may be subjected to the heat treatment to provide the lithium composite oxide.

Hereinafter, one example of the method for covering a surface of the lithium composite oxide with a covering material will be described.

The method for covering the lithium composite oxide with the covering material is not limited. In the method, an atomic layer deposition, neutralization reaction, silane coupling reaction, a sol-gel method, or a planetary ball mill may be used.

An example of the covering material is a metal oxide. In the method for covering the lithium composite oxide with the metal oxide, neutralization reaction may be used. For example, a salt of the metal oxide which is acidic may be added to an alkaline aqueous solution in which the lithium composite oxide has been dissolved. The neutralization reaction occurs due to the addition to form a coating of the metal oxide on the surface of the lithium composite oxide. An example of the acidic metal oxide is manganese nitrate, magnesium nitrate, aluminum sulfate, calcium nitrate, sodium nitrate, potassium nitrate or titanium sulfate.

As the method for covering the lithium composite oxide with the coating material, for example, an atomic layer deposition method may be used to cover the surface of the lithium composite oxide with the coating material. An example of the coating material is alumina, titanium oxide, zirconium oxide, zinc oxide or tantalum oxide.

The state where the cathode active material according to the first embodiment includes the lithium composite oxide and the covering material (in particular, the state where the surface of the lithium composite oxide is covered with the covering material) may be observed by an X-ray electron spectroscopy method, or using a scanning electron microscope or a transmission electron microscope.

Second Embodiment

Hereinafter the second embodiment will be described. The matters described in the first embodiment may be omitted.

The battery according to the second embodiment comprises a cathode containing the lithium composite oxide described in the first embodiment, an anode, and an electrolyte.

The battery according to the second embodiment has a high capacity and a high cycle characteristic.

In the battery according to the second embodiment, the cathode may include a cathode active material layer. The cathode active material layer may contain the cathode active material according to the first embodiment as a main component. In other words, a weight ratio of the lithium composite oxide to the entire of the cathode active material layer is not less than 50%.

Such a cathode active material layer improves the capacity and the cycle characteristic of the battery.

The weight ratio may be not less than 70%.

Such a cathode active material layer improves the capacity and the cycle characteristic of the battery.

The weight ratio may be not less than 90%.

Such a cathode active material layer improves the capacity of the battery.

The battery according to the second embodiment is a lithium ion secondary battery, a non-aqueous secondary battery, or an all-solid battery.

In the battery according to the second embodiment, the anode may contain an anode active material capable of occluding and releasing lithium ions. Alternatively, the anode may contain a material from which a metal lithium is dissolved into the electrolyte during discharge and onto which the metal lithium is precipitated during charge.

In the battery according to the second embodiment, the electrolyte may be a non-aqueous electrolyte (e.g., a non-aqueous electrolyte liquid).

In the battery according to the second embodiment, the electrolyte may be a solid electrolyte.

FIG. 1 shows a cross-sectional view of a battery 10 according to the second embodiment.

As shown in FIG. 1, the battery 10 comprises a cathode 21, an anode 22, a separator 14, a case 11, a sealing plate 15, and a gasket 18.

The separator 14 is disposed between the cathode 21 and the anode 22.

Each of the cathode 21, the anode 22, and the separator 14 may be impregnated with the non-aqueous electrolyte (e.g., the non-aqueous electrolyte liquid).

An electrode group is formed of the cathode 21, the anode 22, and the separator 14.

The electrode group is stored in the case 11.

The case 11 is sealed with the gasket 18 and the sealing plate 15.

The cathode 21 comprises a cathode current collector 12 and a cathode active material layer 13 which is disposed on the cathode current collector 12.

The cathode current collector 12 is made of, for example, a metal material (e.g., at least one selected from the group consisting of aluminum, stainless steel, nickel, iron, titanium, copper, palladium, gold, and platinum or an alloy thereof).

The cathode current collector 12 does not have to be provided. In this case, the case 11 is used as the cathode current collector.

The cathode active material layer 13 contains the cathode active material according to the first embodiment The cathode active material layer 13 may contains an additive (an electric conductive agent, an ion conductive, or a binder), if necessary.

The anode 22 includes an anode current collector 16 and an anode active material layer 17 which is disposed on the anode current collector 16.

The anode current collector 16 is made of, for example, a metal material (e.g., at least one selected from the group consisting of aluminum, stainless steel, nickel, iron, titanium, copper, palladium, gold, and platinum or an alloy thereof).

The anode current collector 16 does not have to be provided. In this case, the sealing plate 15 is used as the anode current collector.

The anode active material layer 17 contains an anode active material.

The anode active material layer 17 may contains an additive (an electric conductive agent, an ion conductive, or a binder), if necessary.

An example of the material of the anode active material is a metal material, a carbon material, an oxide, a nitride, a tin compound, or a silicon compound.

The metal material may be a single metal. Alternatively, the metal material may be an alloy. An example of the metal material is a lithium metal or a lithium alloy.

An example of the carbon material is natural graphite, coke, graphitized carbon, carbon fiber, spherical carbon, artificial graphite, or amorphous carbon.

From the viewpoint of capacity density, silicon (i.e., Si), tin (i.e., Sn), a silicon compound, or a tin compound, may be preferably used. The silicon compound and the tin compound may be an alloy or a solid solution.

An example of the silicon compound is $SiO_x$ (where, $0.05<x<1.95$). A compound provided by substituting a part of silicon atoms of $SiO_x$ with other elements may be used. Such a compound is an alloy or a solid solution. The other elements are at least one kind of element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

An example of the tin compound, is $Ni_2Sn_4$, $Mg_2Sn$, $SnO_x$ (where, $0<x<2$), $SnO_2$, or $SnSiO_3$. One kind of tin compound selected from these may be used alone. Alternatively, a combination of two or more tin compounds selected from these may be used.

The shape of the anode active material is not limited. As the anode active material, an anode active material having a known shape (e.g., granular or fibrous) may be used.

The anode active material layer 17 may be compensated (i.e., occluded) with lithium by any method. Specifically, for example, an example of the method is (a) lithium is deposited on the negative electrode active material layer 17 by a gas phase method such as vacuum deposition, or (b) lithium metal foil and the anode active material layer 17 are brought into contact with each other, and then, heated. In both methods, lithium diffuses into the anode active material layer 17 by heat. In another method, lithium is electrochemically occluded in the negative electrode active material layer 17. In particular, the anode 22 which does not have lithium and a lithium metal foil (anode) are used to assemble the battery. Subsequently, the battery is charged in such a way that lithium is occluded in the anode 22.

An example of the binder of the cathode 21 and the anode 22 is polyvinylidene fluoride, polytetrafluoroethylene, polyethylene, polypropylene, aramid resin, polyamide, polyimide, polyamide imide, polyacrylonitrile, polyacrylic acid, polyacrylic acid methyl ester, polyacrylic acid ethyl ester, polyacrylic acid hexyl ester, poly methacrylic acid, polymethacrylic acid methyl ester, polymethacrylic acid ethyl ester, polymethacrylic acid hexyl ester, polyvinyl acetate, polyvinyl pyrrolidone, polyether, polyethersulfone, hexafluoropolypropylene, styrene butadiene rubber, or carboxymethyl cellulose.

An another example of the binder is a copolymer of two or more kinds of materials selected from the group consisting of hexafluoroethylene, hexafluoropropylene, perfluoroalkyl vinyl ether, vinylidene fluoride, chlorotrifluoroethylene, ethylene, propylene, pentafluoropropylene, fluoromethylvinylether, acrylic acid, and hexadiene. A mixture of two or more kinds of binders selected from the above materials may be used.

An example of the electric conductive agent of the cathode 21 or the anode 22 is graphite, carbon black, a conductive fiber, graphite fluoride, metal powder, a conductive whisker, a conductive metal oxide, and an organic conductive material.

An example of the graphite is natural graphite or artificial graphite.

An example of the carbon black is acetylene black, ketjen black, channel black, furnace black, lamp black, or thermal black.

An example of the metal powder is aluminum powder.

An example of the conductive whisker is a zinc oxide whisker or a potassium titanate whisker.

An example of the conductive metal oxide is titanium oxide.

An example of the organic conductive material is a phenylene derivative.

The electric conductive agent may be used to cover at least a part of the surface of the binder. For example, the surface of the binder may be covered with carbon black. In this way, the capacity of the battery is improved.

A material of the separator 14 is a material having a high ion permeability and a sufficient mechanical strength. An example of the material of the separator 14 is a porous thin film, woven fabric, or non-woven fabric. Specifically, the separator 14 is desirably made of polyolefin such as polypropylene or polyethylene. The separator 14 made of polyolefin not only has excellent durability but also can exhibit a shutdown function when excessively heated. The separator 14 has a thickness in a range of, for example, 10 to 300 μm (or 10 to 40 μm). The separator 14 may be a monolayer film composed of one kind of material. Alternatively, the separator 14 may be a composite film (or multilayer film) composed of two or more kinds of materials. The separator 14 has a porosity in a range of, for example, 30% to 70% (or 35% to 60%). The term "porosity" means a rate of volume of holes to total volume of the separator 14. The porosity is measured by, for example, a mercury intrusion method.

The non-aqueous electrolyte liquid contains a non-aqueous solvent and a lithium salt which has been dissolved in the non-aqueous solvent.

An example of the non-aqueous solvent is a cyclic carbonate ester solvent, a chain carbonate ester solvent, a cyclic ether solvent, a chain ether solvent, a cyclic ester solvent, a chain ester solvent, or a fluorine solvent.

An example of the cyclic carbonate solvent is ethylene carbonate, propylene carbonate, or butylene carbonate.

An example of the chain carbonate ester solvent is dimethyl carbonate, ethyl methyl carbonate, or diethyl carbonate.

An example of the cyclic ether solvent is tetrahydrofuran, 1,4-dioxane, or 1,3-dioxolane.

An example of the chain ether solvent is 1,2-dimethoxyethane or 1,2-diethoxyethane.

An example of the cyclic ester solvent is γ-butyrolactone.

An example of the chain ester solvent is methyl acetate.

An example of the fluorine solvent is fluoroethylene carbonate, methyl fluoropropionate, fluorobenzene, fluoroethylmethyl carbonate, or fluorodimethylene carbonate.

As a non-aqueous solvent, one kind of the non-aqueous solvent selected from these solvents may be used alone. Alternatively, as a non-aqueous solvent, two or more kinds of the non-aqueous solvents selected from these solvents may be used in combination.

The non-aqueous electrolyte liquid may contain at least one fluorine solvent selected from the group consisting of fluoroethylene carbonate, methyl fluoropropionate, fluorobenzene, fluoroethylmethyl carbonate, and fluorodimethylene carbonate.

The at least one fluorine solvent is contained in the non-aqueous electrolyte liquid to improve oxidation resistance of the non-aqueous electrolyte liquid.

As a result, even when the battery 10 is charged at high voltage, the battery 10 is allowed to be operated stably.

In the battery according to the second embodiment, the electrolyte may be a solid electrolyte.

An example of the solid electrolyte is an organic polymer solid electrolyte, an oxide solid electrolyte, or a sulfide solid electrolyte.

An example of the organic polymer solid electrolyte is a compound of a polymer compound and a lithium salt. An example of such a compound is lithium polystyrene sulfonate.

The polymer compound may contain an ethylene oxide structure. The polymer compound has the ethylene oxide structure to contain a lithium salt in large amount. As a result, the ion conductivity is further improved.

An example of the oxide solid electrolyte is:

(i) a NASICON solid electrolyte such as $LiTi_2(PO_4)_3$ or the substitution thereof, (ii) a perovskite solid electrolyte such as $(LaLi)TiO_3$, (iii) a LISICON solid electrolyte such as $Li_{14}ZnGe_4O_{16}$, $Li_4SiO_4$, $LiGeO_4$, or the substitution thereof, (iv) a garnet solid electrolyte such as $Li_7La_3Zr_2O_{12}$ or the substitution thereof, (V) $Li_3N$ or the H-substitution thereof, or (vi) $Li_3PO_4$ or the N-substitution thereof.

An example of the sulfide solid electrolyte is $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$. LiX (where X is F, Cl, Br, or I), $MO_y$, or $Li_xMO_y$ (where M is any of P, Si, Ge, B, Al, Ga, or In, and the values of x and y are natural numbers each independently) may be added to the sulfide solid electrolyte.

Among these, the sulfide solid electrolyte has high formability and high ion conductivity. For this reason, the sulfide solid electrolyte is used as the solid electrolyte to further improve the energy density of the battery.

Among the sulfide solid electrolyte, $Li_2S$—$P_2S_5$ has high electrochemical stability and high ion conductivity. For this reason, $Li_2S$—$P_2S_5$ is used to further improve the energy density of the battery.

A solid electrolyte layer in which the solid electrolyte is included may further contain the non-aqueous electrolyte liquid.

Since the solid electrolyte layer contains the non-aqueous electrolyte liquid, lithium ions are easily transferred between the active material and the solid electrolyte. For this reason, the energy density of the battery is further improved.

The solid electrolyte layer may contain not only the solid electrolyte but also a gel electrolyte or an ion liquid.

An example of the gel electrolyte is a polymer material impregnated with the non-aqueous electrolyte liquid. An example of the polymer material is polyethylene oxide, polyacrylonitrile, polyvinylidene fluoride, or polymethyl methacrylate. Another example of the polymer material is a polymer having an ethylene oxide bond.

An example of the cation included in the ion liquid is:

(i) a cation of an aliphatic chain quaternary ammonium salt such as tetraalkylammonium, (ii) a cation of an aliphatic chain quaternary phosphonium salt such as tetraalkylphosphonium, (iii) an aliphatic cyclic ammonium such as pyrrolidinium, morpholinium, imidazolinium, tetrahydropyrimidinium, piperazinium, or piperidinium, or (iv) a nitrogen-containing heterocyclic aromatic cation such as pyridinium or imidazolium.

An example of the anion included in the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

An example of the lithium salt is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. One kind of the lithium salt may be used alone. Alternatively, a mixture of two or more kinds of the lithium salts may be used. The lithium salt has a concentration of, for example, the range of 0.5 to 2 mol/liter.

With regard to the shape of the battery according to the second embodiment, the battery may be a coin battery, a cylindrical battery, a prismatic battery, a sheet battery, a button battery (i.e., a button cell), a flat-shaped battery, or a laminar battery.

EXAMPLES

Inventive Example 1

(Production of Cathode Active Material)

A mixture of LiF, $LiMnO_2$, $LiCoO_2$, and $LiNiO_2$ was provided so as to have a Li/Mn/Co/Ni/O/F molar ratio of 1.0/0.33/0.33/0.33/1.9/0.1.

The provided mixture was put in a container having a volume of 45 milliliters together with an appropriate amount of balls each formed of zirconia and having a diameter of 3 millimeters, and then, sealed in an argon globe box. The container was made of zirconia.

The container was taken out from the argon globe box. The mixture contained in the container was treated in an argon atmosphere with a planetary ball mill at a rotation rate of 600 rpm for 30 hours to prepare a first precursor.

The first precursor was subjected to a powder X-ray diffraction measurement. As a result of the powder X-ray diffraction measurement, the space group of the first precursor was identified as Fm-3m.

Aside from this, a mixture of LiF, $Li_2O$, $LiMnO_2$, and $MnO_2$ was provided so as to have a Li/Mn/O/F molar ratio of 2.0/1.0/2.8/0.2.

The provided mixture was put in a container having a volume of 45 milliliters together with an appropriate amount of balls each formed of zirconia and having a diameter of 3 millimeters, and then, sealed in an argon globe box. The container was made of zirconia.

The container was taken out from the argon globe box. The mixture contained in the container was treated in an argon atmosphere with a planetary ball mill at a rotation rate of 600 rpm for 5 hours to prepare a second precursor.

The second precursor was subjected to a powder X-ray diffraction measurement. As a result of the powder X-ray diffraction measurement, the space group of the second precursor was identified as Fm-3m.

Next, a mixture of the first precursor and the second precursor was provided so as to have a Li/Mn/Co/Ni/O/F molar ratio of 1.2/0.54/0.13/0.13/1.9/0.1.

The provided mixture was put in a container having a volume of 45 milliliters together with an appropriate amount of balls each formed of zirconia and having a diameter of 3 millimeters, and then, sealed in an argon globe box. The container was made of zirconia.

The container was taken out from the argon globe box. The mixture contained in the container was treated in an argon atmosphere with a planetary ball mill at a rotation rate of 450 rpm for 5 hours to prepare a final precursor.

The final precursor was subjected to heat treatment at an air atmosphere at temperature of 700 degrees Celsius for one hour. In this way, the lithium composite oxide was provided.

The lithium composite oxide was subjected to a powder X-ray diffraction measurement.

Figure 2:
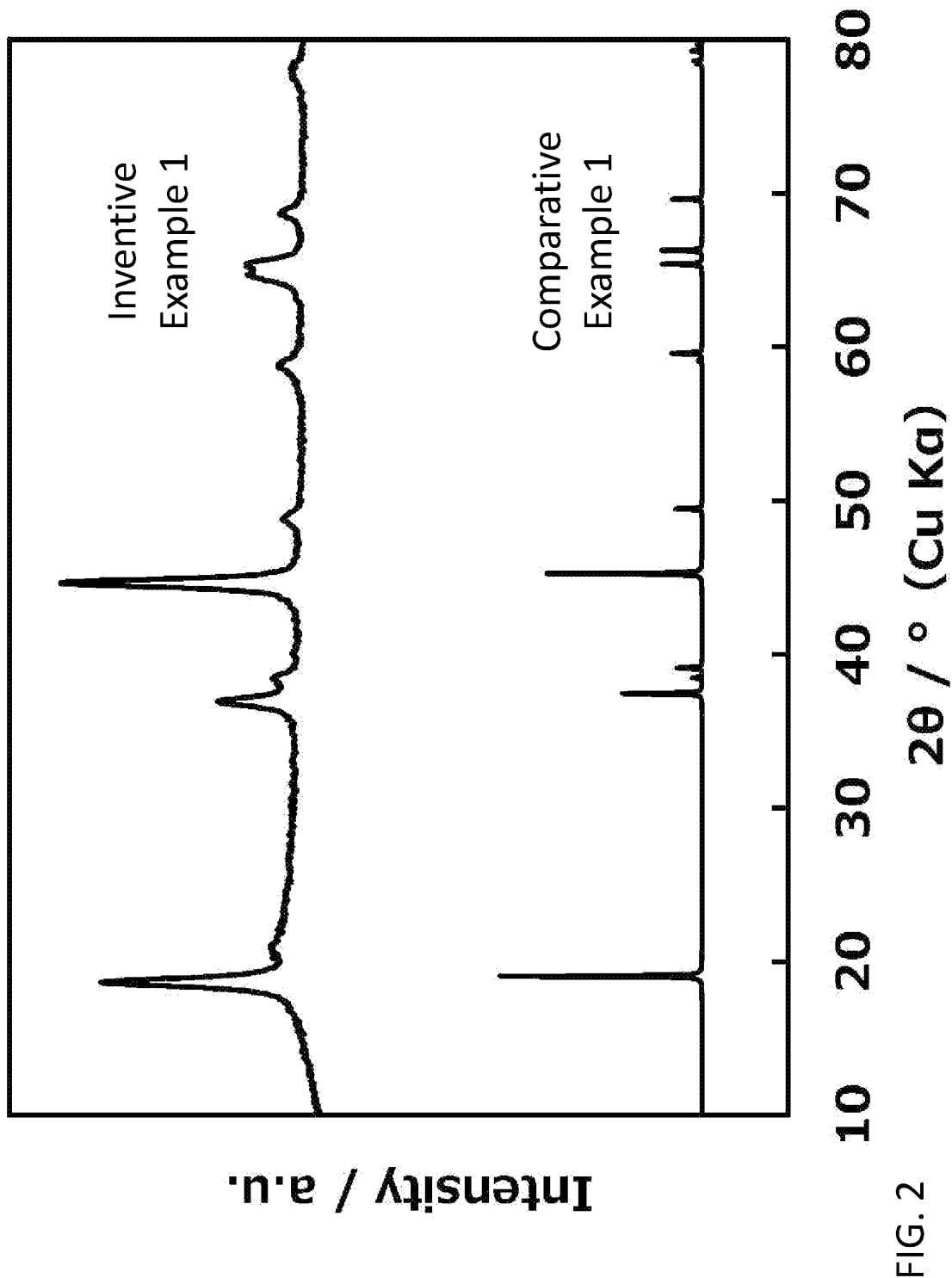
FIG. 2 is a graph showing X-ray diffraction patterns of cathode active materials of the inventive example 1 and the comparative example 1.

FIG. 2 shows a result of the powder X-ray diffraction measurement.

The lithium composite oxide was also subjected to an electron beam diffraction measurement. On the basis of the powder X-ray diffraction measurement and the electron beam diffraction measurement, the crystal structure of the lithium composite oxide was analyzed.

As a result of the analysis of the crystal structure, the lithium composite oxide was identified as a multi-phase mixture including a phase which belongs to a space group C2/m and a phase which belongs to a space group R-3m.

From the result of the powder X-ray diffraction measurement provided with an X-ray diffraction device (Product of Rigaku Corporation), the integral intensity of the X-ray diffraction peak was calculated with an software (trade name: PDXL) included in the X-ray diffraction device. The lithium composite oxide had an integral intensity ratio $I_{(18°-20°)}/I_{(43°-46°)}$ of 0.92.

Next, surface treatment was performed on the surface of the lithium composite oxide by an atomic layer deposition method. In the surface treatment, a coating of alumina (i.e., $Al_2O_3$) was formed on the surface of the lithium composite oxide by alternately laminating trimethylaluminum and water (i.e., water vapor) in a vacuum atmosphere at 120 degrees Celsius. In this way, the cathode active material according to the inventive example 1 was provided.

The cathode active material according to the inventive example 1 was subjected to an X-ray photoelectric spectroscopy measurement. As a result of the X-ray photoelectric spectroscopy measurement, it was confirmed that $Al_2O_3$ was present on the surface of the lithium composite oxide. The $Al_2O_3$ film had a thickness of 5 nanometers.

In the X-ray photoelectric spectroscopy measurement, a peak relative to the $Al_2O_3$ film was hardly confirmed. The reason therefore would be that the $Al_2O_3$ film was thin and in an amorphous state.

(Production of Battery)

Next, 70 weight part of the cathode active material according to the inventive example 1, 20 weight part of acetylene black, 10 weight part of polyvinylidene fluoride (hereinafter, referred to as "PVDF"), and an appropriate amount of N-methyl-2-pyrrolidone (hereinafter, referred to as "NMP") were mixed. In this way, cathode composite slurry was provided. The acetylene black served as an electric conductive agent. The polyvinylidene fluoride served as a binder.

The cathode composite slurry was applied to a surface of a cathode current collector formed of an aluminum foil having a thickness of 20 micrometers.

The cathode composite slurry was dried, and then, pressured to provide a cathode plate having a thickness of 60 micrometers and a comprising a cathode active material layer.

The present inventors confirmed that an effect of the improvement of the cycle characteristic was provided, even in a case where an $Al_2O_3$ film was formed by the above-described atomic layer deposition method on the entire of the cathode active material layer, after an cathode plate was provided using a cathode active material which did not have the covering of $Al_2O_3$.

The provided cathode plate was punched to provide a cathode having a shape of disk having a diameter of 12.5 millimeters.

A lithium metal foil having a thickness of 300 micrometers was punched to provide an anode having a shape of a disk having a diameter of 14.0 millimeters.

Aside from this, fluoroethylene carbonate (hereinafter, referred to as "FEC"), ethylene carbonate (hereinafter, referred to as "EC") and ethyl methyl carbonate (hereinafter, referred to as "EMC") were mixed at a volume ratio of 1:1:6 to provide a non-aqueous solvent.

$LiPF_6$ was dissolved in the non-aqueous solvent at a concentration of 1.0 mol/L to provide a non-aqueous electrolyte solution.

A separator was impregnated with the provided non-aqueous electrolyte solution.

The separator was a product of Celgard, LLC (Trade name: 2320, thickness: 25 micrometers) and a three-layer separator formed of a polypropylene layer, a polyethylene layer, and a polypropylene layer.

A coin cell having a diameter of 20 millimeters and a thickness of 3.2 millimeters was produced using the cathode, the anode, and the separator in a dry box in which the dew point was maintained at minus 50 degrees Celsius.

Inventive Example 2

In the inventive example 2, the cathode active material and the coin cell using the same were provided similarly to the case of the inventive example 1, except for the following matter (i).

(i) The $Al_2O_3$ film had a thickness of not 5 nanometers but 10 nanometers.

Inventive Examples 3-5

In the inventive examples 3-5, the cathode active materials and the coin cells using the same were provided similarly to the case of the inventive example 1, except for the following matter (i).

(i) In the inventive examples 3-5, the materials of the covering materials were MgO, $SiO_2$, and $ZrO_2$, respectively.

Inventive Examples 6-11

In the inventive examples 6-11, the cathode active materials and the coin cells using the same were provided similarly to the case of the inventive example 1, except for the following matters (i) and (ii).

(i) The production condition and the mixture ratio of the mixture of each of the precursors were varied.

(ii) The heat condition was varied within a range of 500-900 degrees Celsius and 10 minutes-5 hours.

Table 1 shows the average composition of the lithium composite oxides of the inventive examples 6-11.

Each of the lithium composite oxides of the inventive examples 6-11 was identified as the multi-phase mixture including the first phase which belongs to the space group C2/m and the second phase which belongs to the space group R-3m.

Comparative Example 1

In the comparative example 1, a cathode active material having a composition represented by the chemical formula $LiCoO_2$ (namely, lithium cobaltate) was provided by a known method.

Unlike the inventive example 1, the $Al_2O_3$ film was not formed in the comparative example 1.

The provided cathode active material was subjected to the powder X-ray diffraction measurement.

FIG. 2 shows the result of the powder X-ray diffraction measurement.

From the result of the powder X-ray diffraction measurement, the space group of the provided cathode active material was identified as R-3m.

The cathode active material according to the comparative example 1 had an integral intensity ratio $I_{(18°-20°)}/I_{(43°-46°)}$ of 1.23.

Similarly to the case of the inventive example 1, a coin cell according to the comparative example 1 was produced with the cathode active material according to the comparative example 1.

Referential Example 1

In the referential example 1, the cathode active material and the coin cell using the same were provided similarly to the case of the inventive example 1, except that the $Al_2O_3$ film was not formed.

Referential Example 2

In the referential example 2, the cathode active material and the coin cell using the same were provided similarly to the case of the inventive example 1, except for the following three matters (i)-(iii).

(i) The $Al_2O_3$ film was not formed.
(ii) The heat condition was 700 degrees Celsius and 12 hours.
(iii) The average composition was adjusted so as to have a Li/Mn/O/F ratio of 1.33/0.67/1.33/0.67.

In the referential example 2, the lithium composite oxide was identified as the multi-phase mixture including the first phase which belongs to the space group C2/m and the second phase which belongs to the space group R-3m.

In the referential example 2, the lithium composite oxide had an integral intensity ratio $I_{(18°-20°)}/I_{(43°-46°)}$ of 1.12.

(Referential example 3)

In the referential example 3, the cathode active material and the coin cell using the same were provided similarly to the case of the inventive example 1, except for the following matters (i)-(ii).

(i) The $Al_2O_3$ film was not formed.
(ii) The average composition was adjusted so as to have a Li/Mn/Co/Ni/O ratio of 1.2/0.54/0.13/0.13/2.0. LiF was not used.

In the referential example 3, the lithium composite oxide was identified as the multi-phase mixture including the first phase which belongs to the space group C2/m and the second phase which belongs to the space group R-3m.

In the referential example 3, the lithium composite oxide had an integral intensity ratio $I_{(18°-20°)}/I_{(43°-46°)}$ of 1.15.

(Evaluation of Batteries)

The batteries according to the inventive examples 1-11 and the referential examples 1-3 were charged at a current density of 0.5 mA/cm$^2$, until the voltage reached 4.7 volts.

Then, the batteries according to the inventive examples 1-11 and the referential examples 1-3 were discharged at a current density of 0.5 mA/cm$^2$, until the voltage reached 2.5 volts.

The battery according to the comparative example 1 was charged at a current density of 0.5 mA/cm$^2$, until the voltage reached 4.3 volts.

Then, the battery according to the comparative example 1 was discharged at a current density of 0.5 mA/cm$^2$, until the voltage reached 2.5 volts.

Furthermore, the above charge-discharge test was repeated 20 times (i.e., 20 cycles), and then, the capacity maintenance ratio of the batteries according to the inventive examples 1-11, the comparative example 1, and the referential example 1 was measured.

Figure 3:
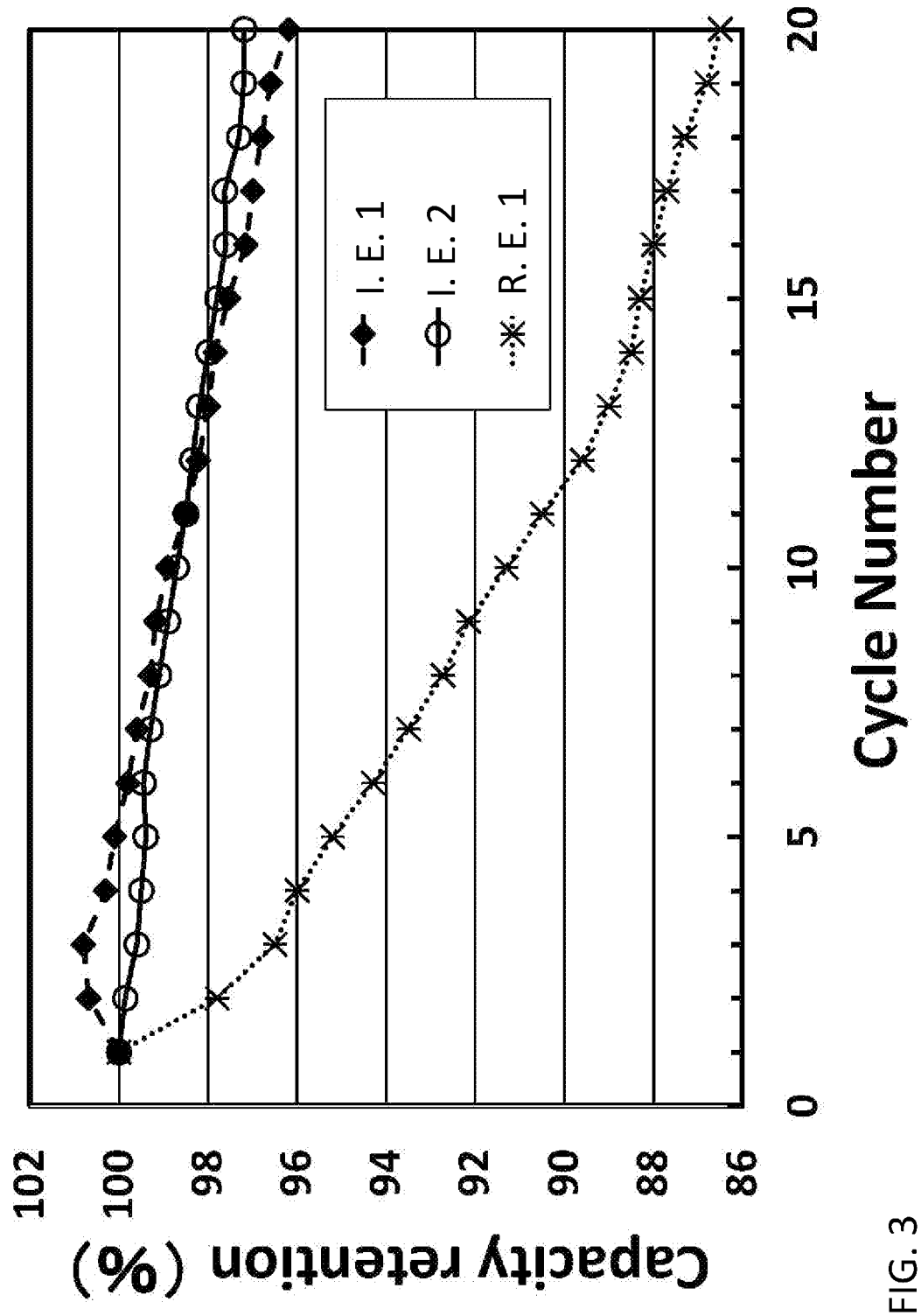
FIG. 3 is a graph showing results of charge-discharge tests of the battery of the inventive examples 1-2 and the referential example 1.

FIG. 3 shows a graph showing the results of the charge-discharge cycle test of the batteries of the inventive example 1-2 and the referential example 1.

The batteries according to the inventive examples 1-2 and the referential example 1 had initial discharge capacities of 279 mAh/g, 275 mAh/g, and 282 mAh/g, respectively.

The batteries according to the inventive examples 1-2 had capacity maintenance ratios after 20 cycles of 96.2% and 97.2%, respectively.

On the other hand, the battery according to the comparative example 1 had an initial discharge capacity of 150 mAh/g and a capacity maintenance ratio after 20 cycles of 80.0%. The battery according to the referential example 1 had a capacity maintenance ratio after 20 cycles of 86.5%.

Table 1-Table 3 show the results of the inventive examples 1-11, the comparative example 1, and the referential examples 1-3.

TABLE 1

| | Lithium composite oxide | | | |
|---|---|---|---|---|
| | Average Composition | x/y | α/β | (x + y)/(α + β) |
| I.E. 1 | $Li_{1.2}Mn_{0.54}Co_{0.13}Ni_{0.13}O_{1.9}F_{0.1}$ | 1.5 | 19 | 1.0 |
| I.E. 2 | $Li_{1.2}Mn_{0.54}Co_{0.13}Ni_{0.13}O_{1.9}F_{0.1}$ | 1.5 | 19 | 1.0 |
| I.E. 3 | $Li_{1.2}Mn_{0.54}Co_{0.13}Ni_{0.13}O_{1.9}F_{0.1}$ | 1.5 | 19 | 1.0 |
| I.E. 4 | $Li_{1.2}Mn_{0.54}Co_{0.13}Ni_{0.13}O_{1.9}F_{0.1}$ | 1.5 | 19 | 1.0 |
| I.E. 5 | $Li_{1.2}Mn_{0.54}Co_{0.13}Ni_{0.13}O_{1.9}F_{0.1}$ | 1.5 | 19 | 1.0 |
| I.E. 6 | $Li_{1.2}Mn_{0.54}Co_{0.13}Ni_{0.13}O_{1.9}F_{0.1}$ | 1.5 | 19 | 1.0 |
| I.E. 7 | $Li_{1.2}Mn_{0.54}Co_{0.13}Ni_{0.13}O_{1.9}F_{0.1}$ | 1.5 | 19 | 1.0 |
| I.E. 8 | $Li_{1.116}Mn_{0.54}Co_{0.167}Ni_{0.167}O_{1.9}F_{0.1}$ | 1.4 | 19 | 1.0 |
| I.E. 9 | $Li_{1.2}Mn_{0.504}Co_{0.136}Ni_{0.16}O_{1.9}F_{0.1}$ | 1.5 | 19 | 1.0 |
| I.E. 10 | $Li_{1.2}Mn_{0.54}Co_{0.11}Ni_{0.11}Al_{0.04}O_{1.9}F_{0.1}$ | 1.5 | 19 | 1.0 |
| I.E. 11 | $Li_{1.2}Mn_{0.54}Co_{0.11}Ni_{0.11}Mg_{0.04}O_{1.9}F_{0.1}$ | 1.5 | 19 | 1.0 |
| C.E. 1 | $LiCoO_2$ | 1.0 | — | 1.0 |
| R.E. 1 | $Li_{1.2}Mn_{0.54}Co_{0.13}Ni_{0.13}O_{1.9}F_{0.1}$ | 1.5 | 19 | 1.0 |
| R.E. 2 | $Li_{1.33}Mn_{0.67}O_{1.33}F_{0.67}$ | 2.0 | 2 | 1.0 |
| R.E. 3 | $Li_{1.2}Mn_{0.54}Co_{0.13}Ni_{0.13}O_{2.0}$ | 1.5 | — | 1.0 |

I.E.: Inventive example
C.E.: Comparative example
R.E.: Referential example

TABLE 2

| | Lithium composite oxide | | |
|---|---|---|---|
| | First Phase | Second Phase | $I_{(18°-20°)}/I_{(43°-46°)}$ |
| I.E. 1 | C2/m | R-3m | 0.92 |
| I.E. 2 | C2/m | R-3m | 0.92 |
| I.E. 3 | C2/m | R-3m | 0.92 |
| I.E. 4 | C2/m | R-3m | 0.92 |
| I.E. 5 | C2/m | R-3m | 0.92 |
| I.E. 6 | C2/m | R-3m | 0.99 |
| I.E. 7 | C2/m | R-3m | 0.75 |
| I.E. 8 | C2/m | R-3m | 0.95 |
| I.E. 9 | C2/m | R-3m | 0.62 |
| I.E. 10 | C2/m | R-3m | 0.88 |
| I.E. 11 | C2/m | R-3m | 0.89 |
| C.E. 1 | — | R-3m | 1.23 |
| R.E. 1 | C2/m | R-3m | 0.92 |
| R.E. 2 | C2/m | R-3m | 1.12 |
| R.E. 3 | C2/m | R-3m | 1.15 |

I.E.: Inventive example
C.E.: Comparative example
R.E.: Referential example

TABLE 3

| | Covering Material | | Initial Discharge | Capacity Maintenance |
|---|---|---|---|---|
| | Composition | Thickness (nm) | Capacity (mAh/g) | Ratio (%) |
| I.E. 1 | Al$_2$O$_3$ | 5 | 279 | 96.2 |
| I.E. 2 | Al$_2$O$_3$ | 10 | 275 | 97.2 |
| I.E. 3 | MgO | 5 | 277 | 95.1 |
| I.E. 4 | SiO$_2$ | 5 | 278 | 95.8 |
| I.E. 5 | ZrO$_2$ | 5 | 275 | 95.6 |
| I.E. 6 | Al$_2$O$_3$ | 5 | 273 | 95.0 |
| I.E. 7 | Al$_2$O$_3$ | 5 | 270 | 94.7 |
| I.E. 8 | Al$_2$O$_3$ | 5 | 274 | 96.0 |
| I.E. 9 | Al$_2$O$_3$ | 5 | 276 | 96.1 |
| I.E. 10 | Al$_2$O$_3$ | 5 | 265 | 94.2 |
| I.E. 11 | Al$_2$O$_3$ | 5 | 266 | 93.8 |
| C.E. 1 | — | — | 150 | 80.0 |
| R.E. 1 | — | — | 282 | 86.5 |
| R.E. 2 | — | — | 265 | — |
| R.E. 3 | — | — | 260 | — |

I.E.: Inventive example
C.E.: Comparative example
R.E.: Referential example

As shown in Table 1-Table 3, the batteries according to the inventive examples 1-11 and the referential examples 1-3 have initial discharge capacities of 260-282 mAh/g.

In other words, each of the batteries according to the inventive examples 1-11 and the referential examples 1-3 has a much larger initial discharge capacity than the battery according to the comparative example 1.

The reasons therefor would be that, in the batteries according to the inventive examples 1-11 and the referential examples 1-3, the lithium composite oxide contained in the cathode active material is a multi-phase mixture including the first phase having the crystal structure which belongs to the space group C2/m and the second phase having the crystal structure which belongs to the space group R-3m and the integral intensity ratio $I_{(18°-20°)}/I_{(43°-46°)}$ of not less than 0.05 and not more than 1.15. For this reason, Li in large amount are allowed to be inserted and desorbed, and the diffusivity of Li and the stability of the crystal structure would be high. This would improve the initial discharge capacity significantly.

In the comparative example 1, the integral intensity ratio $I_{(18°-20°)}/I_{(43°-46°)}$ is more than 0.99. Furthermore, in the comparative example 1, the crystal structure is a monophase of the space group R-3m. For this reason, the insertion amount and the desorption amount of Li during the charge and discharge would be lowered. The stability of the crystal structure would be also lowered. For this reason, the amount of Li which would be allowed to contribute to the reaction is lowered to decrease the diffusivity of Li ions. For this reason, the initial discharge capacity would be lowered significantly.

As shown in Table 1-Table 3, the battery according to the inventive example 6 has a smaller initial discharge capacity than the battery according to the inventive example 1.

The reason therefor would be that the battery according to the inventive example 6 has a larger integral intensity ratio $I_{(18°-20°)}/I_{(43°-46°)}$ than the battery according to the inventive example 1. This would lower the stability of the crystal structure due to the oxygen desorption upon the desorption of Li. As a result, the initial discharge capacity would be lowered.

As shown in Table 1-Table 3, the battery according to the inventive example 7 has a smaller initial discharge capacity than the battery according to the inventive example 1.

The reason therefor would be that the battery according to the inventive example 7 has a smaller integral intensity ratio $I_{(18°-20°)}/I_{(43°-46°)}$ than the battery according to the inventive example 1. This would increase the amount of the cation mixing to lower the diffusivity of the Li during the charge and discharge. As a result, the initial discharge capacity would be lowered.

As shown in Table 1-Table 3, the battery according to the inventive example 8 has a smaller initial discharge capacity than the battery according to the inventive example 1.

The reason therefor would be that the battery according to the inventive example 8 has a small value of x/y of 1.4, which is smaller than that of the inventive example 1. For this reason, the amount of Li which would be allowed to contribute to the charge and discharge is lowered. Furthermore, the battery according to the inventive example 8 has a smaller Mn content than the battery according to the inventive example 1. For these reasons, redox of oxygen was not used sufficiently. As a result, the initial discharge capacity would be lowered.

As shown in Table 1-Table 3, the battery according to the inventive example 9 has a smaller initial discharge capacity than the battery according to the inventive example 1.

The reason therefor would be that the battery according to the inventive example 9 has a smaller integral intensity ratio $I_{(18°-20°)}/I_{(43°-46°)}$ than the battery according to the inventive example 1. This would increase the amount of the cation mixing to lower the diffusivity of the Li during the charge and discharge. Furthermore, the battery according to the inventive example 9 has a smaller Mn content than the battery according to the inventive example 1. For these reasons, redox of oxygen was not used sufficiently. As a result, the initial discharge capacity would be lowered.

As shown in Table 1-Table 3, each of the batteries according to the inventive examples 10 and 11 has a smaller initial discharge capacity than the battery according to the inventive example 1.

The reason therefor would be that each of the batteries according to the inventive examples 10 and 11 has smaller Co and Ni contents than the battery according to the inventive example 1. For this reason, the crystal structure would be destabilized. For this reason, the initial discharge capacity would be lowered.

As shown in Table 1-Table 3, the battery according to the referential example 2 has a smaller initial discharge capacity than the battery according to the inventive example 1.

The reason therefor would be that the battery according to the referential example 2 has a larger integral intensity ratio $I_{(18°-20°)}/I_{(43°-46°)}$ than the battery according to the inventive example 1. This decreases the stability of the crystal structure due to the oxygen desorption upon the Li desorption. Another reason therefor would be that the battery according to the referential example 2 has a large value of x/y, which is equal to 2.0, than the battery according to the inventive example 1. This would destabilize the crystal structure upon the Li desorption. Still another reason therefor would be that the battery according to the referential example 2 has a larger F content (namely, α/β=2) than the battery according to the inventive example 1. This would lower the electron conductivity. Furthermore, the diffusivity of Li which has been bound to F in the crystal structure would be lowered. For these reasons, the initial discharge capacity would be lowered.

As shown in Table 1-Table 3, the battery according to the referential example 3 has a smaller initial discharge capacity than the battery according to the inventive example 1.

The reason therefor would be that the battery according to the referential example 3 has a larger integral intensity ratio $I_{(18°-20°)}/I_{(43°-46°)}$ than the battery according to the inventive example 1. This decreases the stability of the crystal structure due to the oxygen desorption upon the Li desorption. Another reason therefor would be that the lithium composite oxide included in the cathode active material does not contain F in the reference example 3. This would destabilize the crystal structure to deteriorate the crystal structure upon the desorption of Li during the charge. For these reasons, the initial discharge capacity would be lowered.

As above described, the lithium composite oxide has an integral intensity ratio $I_{(18°-20°)}/I_{(43°-46°)}$ of not more than 0.99 and includes F to further raise the initial discharge capacity of the battery.

As shown in Table 1-Table 3, each of the batteries according to the inventive examples 1-11 has a higher capacity maintenance ratio after 20 cycles than the batteries according to the comparative example 1 and the referential example 1.

The reason therefor would be that each of the batteries according to the inventive examples 1-11 includes the covering material on the surface of the lithium composite oxide. In other words, the surface of the lithium composite oxide would be prevented from being brought into contact with the electrolyte solution. This would prevent, for example, the gas from being generated due to the side reaction between the lithium composite oxide and the electrolyte solution, the oxygen from being desorbed, and the side-reaction product from being generated on the surface of the cathode active material. As a result, the capacity maintenance ratio after 20 cycles would be improved.

As shown in Table 1-Table 3, the battery according to the inventive example 2 has a smaller initial discharge capacity and a higher capacity maintenance ratio after 20 cycles than the battery according to the inventive example 1.

The reason therefor would be that the battery according to the inventive example 2 has a larger thickness of the $Al_2O_3$ film, which serves as the covering material, than the battery according to the inventive example 1. This would prevent the side reaction between the lithium composite oxide and the electrolyte solution from being generated, whereas this would increase the resistance relative to the Li conductivity.

As shown in Table 1-Table 3, each of the batteries according to the inventive examples 1 and 3-5 has a higher capacity maintenance ratio after 20 cycles than the battery according to the referential example 1. In the batteries according to the inventive examples 1 and 3-5, the materials of the covering materials were $Al_2O_3$, MgO, $SiO_2$, and $ZrO_2$. This reveals that the material of the covering material is not limited to $Al_2O_3$, and that various materials may be used as the material of the covering material in the present disclosure. $Al_2O_3$ is suitable as the covering material used in the present disclosure to achieve a battery having a further high capacity and cycle characteristic.

INDUSTRIAL APPLICABILITY

The cathode active material of the present disclosure can be used for a battery such as a secondary battery.

REFERENTIAL SIGNS LIST

10 Battery
11 Case
12 Cathode current collector
13 Cathode active material layer
14 Separator
15 Seal plate
16 Anode current collector
17 Anode active material layer
18 Gasket
21 Cathode
22 Anode

The invention claimed is:

1. A cathode active material, comprising:
a lithium composite oxide; and
a covering material which covers a surface of the lithium composite oxide,
wherein
the lithium composite oxide is a multi-phase mixture including:
a first phase having a crystal structure which belongs to a space group C2/m; and
a second phase having a crystal structure which belongs to a space group R-3m;
the following mathematical formula (I) is satisfied:

$$0.05 \leq \text{integral intensity ratio } I_{(18°-20°)}/I_{(43°-46°)} \leq 0.99 \quad (I)$$

the integral intensity ratio $I_{(18°-20°)}/I_{(43°-46°)}$ is a ratio of an integral intensity $I_{(18°-20°)}$ to an integral intensity $I_{(43°-46°)}$;
the integral intensity $I_{(43°-46°)}$ is an integral intensity of a first peak which is a maximum peak present within a range of a diffraction angle 2θ of not less than 43° and not more than 46° in an X-ray diffraction pattern of the lithium composite oxide; and
the integral intensity $I_{(18°-20°)}$ is an integral intensity of a second peak which is a maximum peak present within a range of a diffraction angle 2θ of not less than 18° and not more than 20° in the X-ray diffraction pattern of the lithium composite oxide, and
the covering material has an electronic conductivity of not more than $10^6$ S/m.

2. The cathode active material according to claim 1, wherein
the covering material is an inorganic material.

3. The cathode active material according to claim 1, wherein
a mass ratio of the covering material to the lithium composite oxide is not more than 0.2.

4. The cathode active material according to claim 3, wherein
the mass ratio of the covering material to the lithium composite oxide is not less than 0.01 and not more than 0.1.

5. The cathode active material according to claim 1, wherein
the covering material has a thickness of not less than 0.1 nanometer and not more than 10.0 nanometers.

6. The cathode active material according to claim 1, wherein
the covering material forms a solid solution with at least a part of the surface of the lithium composite oxide.

7. The cathode active material according to claim 1, wherein
the covering material is formed of an oxide or an oxynitride.

8. The cathode active material according to claim 7, wherein
the covering material is represented by a composition formula $Li_aA_bO_cN_d$,
where
A is at least one selected from the group consisting of Mn, Co, Ni, Fe, Cu, Nb, Mo, Ti, Al, Cr, Zr, Zn, Na, K, Ca, Mg, Pt, Au, B, P, Si, Eu, Sm, Ce, and H,
$0 \leq a \leq 3$,
$0.5 \leq b \leq 4$, $1 \leq c \leq 4$, and
$0 \leq d \leq 1$.

9. The cathode active material according to claim 8, wherein
the covering material is formed of at least one selected from the group consisting of $NiO_2$, $CoO_2$, $MnO_2$, $Al_2O_3$, $MgO$, $SiO_2$, $ZrO_2$, $LiNbO_3$, $LiBO_2$, and $Li_{3-e}PO_{4-f}N_g$ (where $0 \leq e \leq 3$, $0 \leq f \leq 3$, and $0 \leq g \leq 1$).

10. The cathode active material according to claim 9, wherein
the covering material is formed of at least one selected from the group consisting of $Al_2O_3$, $SiO_2$, and $ZrO_2$.

11. The cathode active material according to claim 1, wherein
the integral intensity ratio $I_{(18°-20°)}/I_{(43°-46°)}$ is not less than 0.62 and not more than 0.99.

12. The cathode active material according to claim 1, wherein
the lithium composite oxide contains Mn.

13. The cathode active material according to claim 1, wherein
the lithium composite oxide contains at least one selected from the group consisting of F, Cl, N, and S.

14. The cathode active material according to claim 13, wherein
the lithium composite oxide contains F.

15. The cathode active material according to claim 1, wherein
the lithium composite oxide has an average composition represented by a composition formula $Li_xMe_yO_\alpha Q_\beta$, where
Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al;
Q is at least one selected from the group consisting of F, Cl, N and S;
$1.05 \leq x \leq 1.5$;
$0.6 \leq y \leq 1.0$;
$1.2 \leq \alpha 2.0$; and
$0.8 \leq \beta \leq 0.8$.

16. The cathode active material according to claim 1, wherein
the cathode active material includes the lithium composite oxide as a main component.

17. The cathode active material according to claim 1, wherein
the multi-phase mixture is a two-phase mixture composed of the first phase and the second phase.

18. A battery, comprising:
a cathode including a cathode active material according to claim 1;
an anode; and
an electrolyte.

19. The battery according to claim 18, wherein
the anode contains at least one selected from the group consisting of:
(i) an anode active material capable of occluding and releasing lithium ions, and
(ii) a material from which a metal lithium is dissolved into the electrolyte during discharge and onto which the metal lithium is precipitated during charge; and
the electrolyte is a non-aqueous electrolyte.

20. The battery according to claim 18, wherein
the anode contains at least one selected from the group consisting of:
(i) an anode active material capable of occluding and releasing lithium ions, and
(ii) a material from which a metal lithium is dissolved into the electrolyte during discharge and onto which the metal lithium is precipitated during charge; and
the electrolyte is a solid electrolyte.

* * * * *